(No Model.)

L. HARRIS.
HUB ATTACHING DEVICE.

No. 476,199. Patented May 31, 1892.

Witnesses
Clar. A. Williams
Newton G. Leslie.

Inventor
Levi Harris
By his Attorney Lucius C. West

United States Patent Office.

LEVI HARRIS, OF KALAMAZOO, MICHIGAN, ASSIGNOR OF ONE-HALF TO OSCAR M. ALLEN, SR., OF SAME PLACE.

HUB-ATTACHING DEVICE.

SPECIFICATION forming part of Letters Patent No. 476,199, dated May 31, 1892.

Application filed February 15, 1892. Serial No. 421,574. (No model.)

*To all whom it may concern:*

Be it known that I, LEVI HARRIS, a citizen of the United States, residing at Kalamazoo, county of Kalamazoo, State of Michigan, have invented a new and useful Vehicle-Wheel-Box and Axle, of which the following is a specification.

This invention relates to constructions devised for taking up the end wear of vehicle wheels and axles to prevent end shucking and rattling without using the ordinary washers, such as leather and the like.

The object of this invention is to take up said end wear by means of a peculiarly constructed nut and metal washer in old vehicles already in use, thus dispensing with the leather washers and without any change in the construction of the old wheel-box and axle.

Figure 1:
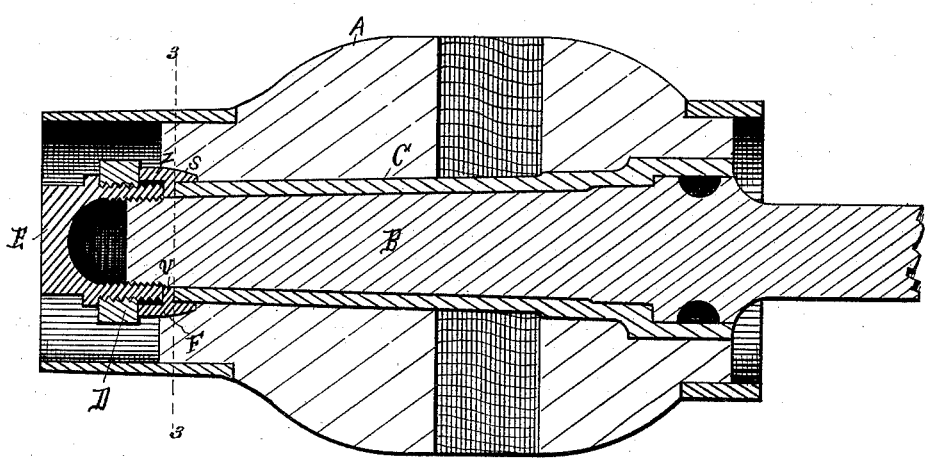
Figure 2:
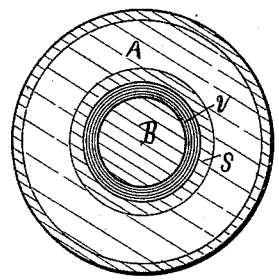

In the drawings forming a part of this specification, Figure 1 is a longitudinal section of the axle and wheel-hub, and Fig. 2 is a cross-section on line 3 3 in Fig. 1 looking from a point at the right.

Referring to the lettered parts of the drawings, B represents an ordinary axle having a threaded outer end, as they are commonly made, and C is the wheel-box, such as is employed in old wheels now in use. It is a common practice to put leather washers between the rear shoulders of the box and the shoulders of the axle and also between the end of the box and the nut which holds the wheel on the axle.

My design is to furnish to the trade, as an article of manufacture, a metal washer and nut, below described in detail, which can be purchased by the owners of old vehicles and used in lieu of the ordinary nut, thereby being enabled to quickly to take up the wear and prevent the shucking of the wheel and avoid the annoyance and expense of said leather washers.

At E is shown the wheel-holding nut screwed onto the threaded end of the axle B. The outer periphery of the inner end of said nut E is screw-threaded, and a supplemental nut D is screwed onto said threaded portion of the nut E, as shown in Fig. 1, and remains thereon, even when the nut E is removed from the axle.

I employ a metal washer F, the body portion $v$ of which fits against the outer end of the box C. This washer is flanged rearwardly, as at $s$, which flange loosely surrounds the outer end of the box, so as not to bind when the wheel and box revolve. The washer also has an outwardly-extending flange $z$, as in Fig. 1, which surrounds the inner end of the nut E. In the use of this washer and nut the washer F is first placed on the end of the axle B and against the wheel-box. The nut E is then screwed onto the end of the axle B sufficiently close against the body $v$ of said washer to prevent any end shucking of the wheel and still allow said wheel to freely revolve. It will readily be seen that no leather washers are needed and the wheel has close nice bearings.

The office of the supplemental nut D is explained as follows: In case the box and axle become unduly worn this supplemental nut, which fits against the outer flange $z$ of the washer, is tightened by turning it sufficiently close against the box to take up the end wear, thus again establishing nice close bearings.

Having thus described my invention, what I claim as new, and desire to secure by Letters Patent of the United States, is—

As an article of manufacture, a metal washer for fitting against the end of a wheel-box and having the inner and outer flanges, a wheel-holding nut screw-threaded on its outer periphery at the inner end, and a supplemental nut adjustable on said threaded portion of the wheel-holding nut in a manner to be tightened against the flange of said washer, substantially as set forth.

In testimony of the foregoing I have hereunto subscribed my name in the presence of two witnesses.

LEVI HARRIS.

Witnesses:
P. N. ARVIDSON,
GEO. H. BOLLES.